United States Patent [19]

Trump

[11] 4,420,249
[45] Dec. 13, 1983

[54] IMAGE REPROPORTIONING MACHINE

[75] Inventor: Dennis H. Trump, Nashua, N.H.

[73] Assignee: Nashua Control Instruments, Inc., Nashua, N.H.

[21] Appl. No.: 376,028

[22] Filed: May 7, 1982

[51] Int. Cl.³ .............................................. G03B 27/10
[52] U.S. Cl. ......................................... 355/84; 355/52
[58] Field of Search ................................... 355/52, 84

[56] References Cited

U.S. PATENT DOCUMENTS

| | | | |
|---|---|---|---|
| 3,374,724 | 3/1968 | Torres | 355/52 |
| 3,445,165 | 5/1969 | Dubbs | 355/84 |
| 3,767,301 | 10/1973 | Solo | 355/52 |
| 3,992,094 | 11/1976 | Adcock | 355/52 |
| 4,008,959 | 2/1977 | Parsons | 355/52 |
| 4,238,156 | 12/1980 | Parsons | 355/52 |

*Primary Examiner*—Monroe H. Hayes
*Attorney, Agent, or Firm*—Schiller & Pandiscio

[57] ABSTRACT

An improved image reproportioning system is of the type for reproducing an image from an image bearing sheet onto a photosensitive sheet so that the scale of one dimension of the reproduced image can be changed relative to its other dimension. The system comprises a first sheet supporting member for supporting one of the sheets, and a second sheet supporting member for supporting the other of the sheets in substantial juxtaposition with the first sheet. The system also includes means for defining a slit of light, and means for moving the first and second sheet supporting members at a substantially constant speed in a first direction parallel to the direction of the one dimension and transverse to the slit of light so that the sheets pass through and are exposed by the slit of light. Means are also provided for moving the first and second sheet supporting members relative to one another at a substantially constant relative speed as the sheets are exposed to the slit of light. The relative speed is a function of the percentage of change of the scale of the one dimension. The means for moving the first and second sheet supporting members relative to one another includes (a) means for spring biasing the first and second members so that the second member is biased to move relative to the first member in a direction parallel to the first direction; (b) ramp means; (c) means for adjusting the angle of inclination or declination of the ramp means in the first direction; and (d) cam arm means (1) pivotally mounted to and adapted to move with the first sheet member, and (2) cooperative with the ramp means so as to move the second member relative to the first member at a constant linear speed against the bias means as the first and second members move at the substantially constant speed.

17 Claims, 7 Drawing Figures

IMAGE REPROPORTIONING MACHINE

The present invention relates generally to image reproportioning systems, and more particularly to systems for reproducing a photographic image with a predetermined uniform scalar change in one dimension.

Reproportioning systems are well known. Typically, the image bearing sheet, such as a negative, and a photosensitive sheet are moved relative to one another during exposure so as to produce a change in the scale of the dimension of the image of the negative in the direction of movement as it is recorded on the photosensitive sheet. Image reproportioning systems are particularly useful in high production flexographic printing processes. Generally, in such processes, the printing plate is made of a flexible material so that it can be wrapped around a rotatable cylinder of the printing system whereby the cylinder and thus the printing plate are rotated at relatively high speed during the printing process. When making the printing plate, i.e., when forming the image on the flexible material, the latter is usually laid flat. However, when wrapped around the cylinder the material is stretched so that there is typically an enlargement of the image in the direction around the cylinder. Accordingly, image reproportioning systems have been used to reduce the image in the dimension that is to follow the direction around the cylinder so that when wrapped and stretched around the cylinder the size of the image is accurate This is particularly important when flexographically printing images in more than one color where the color components of an image are separately printed over one another requiring extremely accurate registration. Other uses of image reproportioning systems have included image modification for purely artistic reasons, modifying images for newspaper copy to fit within a particular space, as well as modifying images for advertising copy. Two such systems are shown and described in U.S. Pat. No. 3,445,165 issued May 20, 1969 to W. P. Dubbs and U.S. Pat. No. 4,008,959 issued Feb. 22, 1977 to James C. Parsons.

U.S. Pat. No. 3,445,165 shows a system including two frame members, one positioned within the other, for respectively supporting the photographic negative and a photosensitive sheet on which the image from the negative is to be recorded. The desired scalar change in the form of an increase (i.e., enlargement) or decrease (i.e., shrinkage) in one dimension of the photographic image is determined by the angular position of a cam bar relative to the direction of travel of the two frame members during exposure. More particularly, the first or master frame member for supporting the photosensitive sheet is driven by a constant-speed, reversible motor. The latter is coupled to the former through rack and pinion gearing. The second or slave frame member for supporting the photographic negative is mounted to move with and in the same direction as the first frame member. The first frame member is coupled to the second frame member by a cable and pulley system so as to effect during exposure relative movement between the two frame members, and more particularly, between the negative and photosensitive sheet. The first frame member carries a slide bar oriented in a perpendicular direction to the direction of travel. A first block is mounted and freely slides on the slide bar. The block is coupled to the cable. A second block coupled to the first block is adapted to slide on the adjustable cam bar as the two frame members move during exposure. The cam bar is pivotably mounted at one end so that the angle of the cam bar relative to the direction of frame member travel can be set by a translator mechanism. The latter includes a third slide block mounted on the adjustable cam bar at a distance from the pivotal end. The third slide block is pivotally secured to a fourth slide block, the latter being movable along a lead screw oriented at an angle to the adjustable cam bar. Rotation of the lead screw, moves the fourth, and thus the third block. This has the effect of pivotally moving the cam bar about its pivotal end. During operation as the two frame members move, the second block moves along the cam bar. As the second block moves, the first block will move on the first slide bar thereby moving the cable coupling the two frame members by an amount depending upon the angle of the cam bar relative to the direction of travel of the two frame members. Positioning the cam arm so that it is directed at an angle to one side of the direction of travel of the frame members results in (1) the cable moving in one direction, and (2) the second frame member moving faster than the first frame member when the exposure is made. This results in an increase in the scale of the dimension of the photographic image on the negative (mounted on the second frame member) in the direction of frame member motion when recorded on the photosensitive sheet (mounted on the first frame member). Where a decrease in the scale of this dimension is desired the adjustable cam bar is positioned so that it is directed at an angle to the other side of the direction of frame member motion. In this latter situation the first block slides on the slide bar in an opposite direction as the frames move, pulling the cable in the opposite direction resulting in the second frame member moving more slowly than the first frame member. This in turn moves the negative faster than the photosensitive sheet so as to provide the desired decrease in the scale of the image dimension The amount of reproportioning of the image, i.e., the amount of relative increase or decrease of the scale of this image dimension, is therefore a function of the angle that the cam bar makes with the direction of frame member motion. Since the first block slides on the slide bar in a direction perpendicular to frame member motion and the cable is pulled by a like amount, the setting of proportionality is a function of the tangent of the angle between the cam bar and the frame motion direction.

The apparatus shown in U.S. Pat. No. 4,008,959 employs two coplanar tables mounted for movement in parallel directions in a common plane. A support below the master table is provided with a groove, oriented perpendicular to the direction of table movement. A block including a roller is slidably mounted in the groove. The block is attached to one end of a cable. The cable is fed through a pulley system and connected to the slave table. The other end of the cable is attached to a weight for biasing the tables back toward their starting position. A speed control arm, adapted to cooperate with the roller, is pivotably connected at one end to the master table and adjustably fixed at its other end to the master table. Operation of the motor results in the master table moving at a constant speed. As the master table moves, the control arm moves with it. As the control arm moves, it cams the roller and thus the block, so that the latter moves in the groove of the support. Movement of the block in the groove pulls the cable so as to move the slave table. The relative speed between the two tables is determined by the angle that the camming edge of the control arm makes relative to the direction of table movement. The slave table will thus always move faster or at the same speed as the master table. Therefore, when it is desired to enlarge the dimension of an image of a negative on the photosensitive sheet, the negative overlaps the photosensitive sheet, with the negative adapted to move with the slave table and the photosensitive sheet adapted to move with the master table. Conversely, for reducing the image dimension, the negative overlaps the photosensitive sheet, but is adapted to move with the master table, while the photosensitive sheet is adapted to move with the slave table.

The major disadvantage of the two patented apparatus described above is their inability to resolve fine detail and produce striation free copy and therefore fail to meet the current needs of high speed quality flexographic printing. For example, a flexographic printer should be able to print the dots which form an image or tints which are typically formed by densely spaced lines, e.g., 133 lines per inch. However, with the two patented systems, it has been found that such dots and lines tend to smear due to poor resolution. Such poor resolution is believed to be a function of the source of light used to expose the image bearing and photosensitive sheets. Such image smearing is believed to be due to the fact that the light source is defined, in part, by a mechanical slit which is too wide. Further, the lightsources spaced from the slit typically employed in these patented devices are ill defined so that they do not insure uniformity of intensity of light through the slit causing diffusion. As a result of this distortion, fine detail is often stripped in after the flexographic printing has been performed. This, of course, is tedious and unsatisfactory. Further, the prior art devices tend to use relatively low light intensity through the slit forcing the operator to use high speed film. This means that the copy made is a reverse of the original This is disadvantageous in flexographic printing where it would be preferred to retain the original image. In addition, distortion in the form of image striations can be provided by the drive systems employed in the two described patented apparatus due to nonuniformities in rate of exposure. Specifically, both systems each utilize a cable and pulley system to connect the master and slave tables. Slack in the cable will cause inaccuracies and distortion. Other problems associated with cable and pulley systems are well known.

The Dubbs apparatus includes an elongated roller positioned below the photosensitive print and negative opposite the light slit for pressing the negative and photosensitive print against a sheet of glass when exposed to the slit of light. The Parsons system requires the negative and photosensitive print to move relative to one another and to an opaque cover sheet. Apparently, no special structure is provided to insure that the negative and photosensitive sheet are in contact when exposed to the light slit.

In addition while the setting of each machine as a function of the percentage of the increase in scale or enlargement of the image dimension is a linear function, the setting of each machine as a function of the percentage reduction of the image dimension is a nonlinear function. Thus, setting the percentage of the desired amount of image reduction in one dimension will not be uniformly accurate.

It is an object of the present invention to substantially reduce or overcome the problems associated with the above-noted prior art.

Another object of the present invention is to provide an image reproportioning system in which smooth contact between the negative and photosensitive sheet is provided.

And another object of the present invention is to provide an image reproportioning system which provides a narrower, more uniformly intense slit of light during exposure.

Yet another object of the present invention is to provide an image reproportioning system having a more uniform drive system for driving the master frame member.

Still another object of the present invention is to provide an image reproportioning system having a drive system for driving one frame at an adjustable speed relative to the other frame such that the setting of the amount of change of the scalar of one of the dimensions of the image is a linear function regardless of whether the scalar is increased or decreased.

These and other objects of the present invention are achieved by an improved image reproportioning system of the type for reproducing an image from an image bearing sheet onto a photosensitive sheet so that the scale of one dimension of the reproduced image can be changed relative to its other dimension. The system comprises a first sheet supporting member for supporting one of the sheets, and a second sheet supporting member for supporting the other of the sheets in substantial juxtaposition with the first sheet. The system also includes means for defining a slit of light, and means for moving the first and second sheet supporting members at a substantially constant speed in a first direction parallel to the direction of the one dimension and transverse to the slit of light so that the sheets pass through and are exposed by the slit of light. Means are also provided for moving the first and second sheet supporting members relative to one another at a substantially constant relative speed as the sheets are exposed to the slit of light. The relative speed is a function of the percentage of change of the scale of the one dimension. The means for moving the first and second sheet supporting members relative to one another includes (a) means for spring biasing the first and second members so that the second member is biased to move relative to the first member in a direction parallel to the first direction; (b) ramp means; (c) means for adjusting the angle of inclination or declination of the ramp means in the first direction; and (d) cam arm means (1) pivotally mounted to and adapted to move with the first sheet member, and (2) cooperative with the ramp means so as to move the second member relative to the first member at a constant linear speed against the bias means as the first and second members move at the substantially constant speed.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

In the drawings the same numerals are used to refer to like or similar parts.

Figure 1:
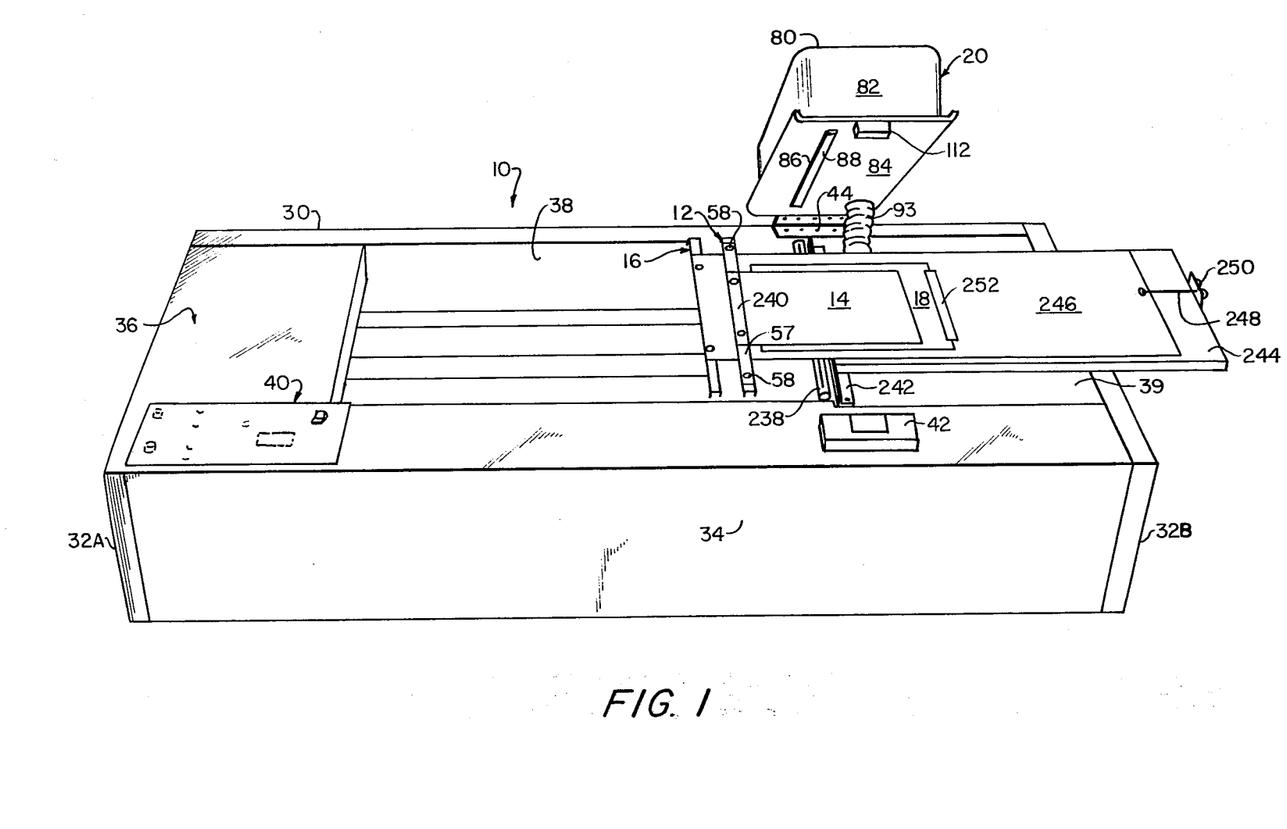
FIG. 1 is a perspective view of the preferred embodiment of the apparatus of the present invention.
Figure 2:
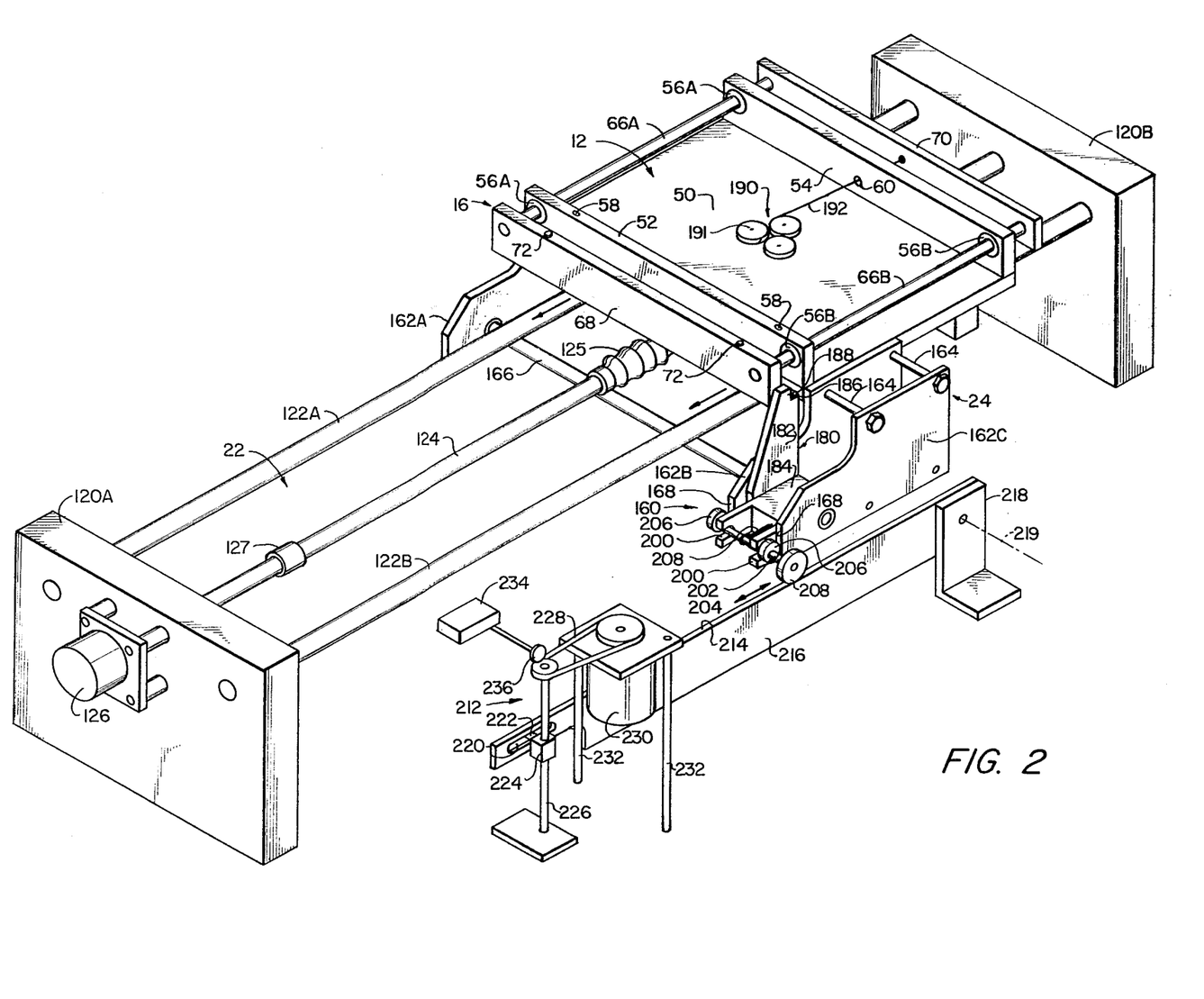
FIG. 2 is a perspective view of a portion of the preferred embodiment of FIG. 1 illustrating the driving mechanism for moving each of the two sheet supporting members.
Figure 3:
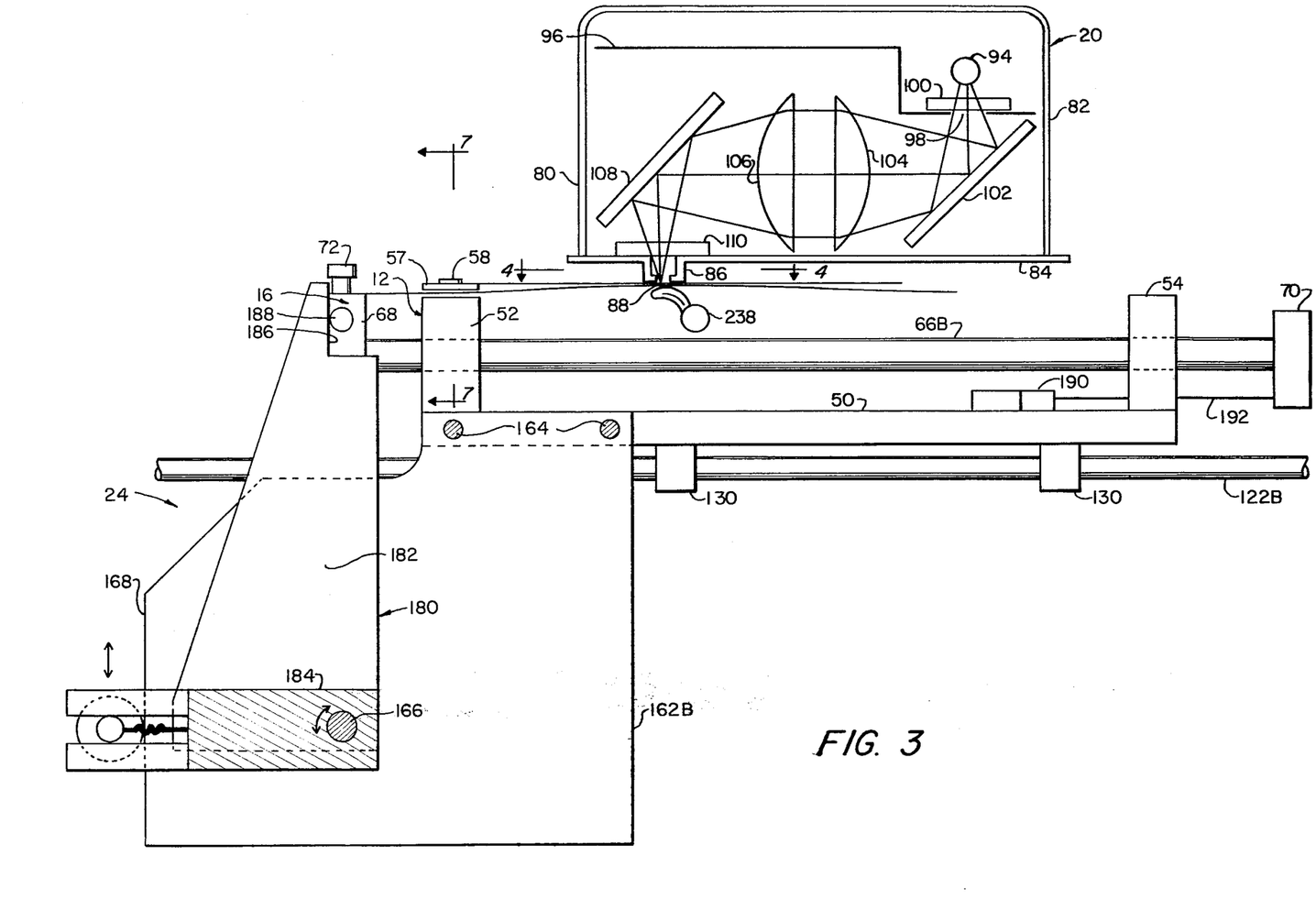
FIG. 3 is a partial cross-sectional view taken along section line 3—3 of FIG. 2.

Referring to the FIGS., the system 10 generally includes (1) a general housing construction (shown in FIG. 1), (2) a first sheet supporting member 12 (best shown in FIGS. 2 and 3) preferably for supporting the image bearing sheet 14, such as a photographic negative (shown in FIGS. 1 and 3); (3) a second sheet supporting member 16 (best shown in FIGS. 2 and 3), preferably for supporting the sheet of photosensitive material 18 (shown in FIGS. 2 and 3 underneath and juxtaposed with sheet 14); (4) light source means, generally indicated at 20, for defining a slit of light (shown generally in FIGS. 1 and 3); (5) means, generally indicated at 22, for moving members 12 and 16 at a substantially constant speed (shown in FIG. 2, and partially in FIGS. 3 and 5) so as to expose the sheets 14 and 18 to the slit of slight provided by light source means 20; and (6) means, generally indicated at 24, for moving the members 12 and 16 relative to one another (shown in FIG. 2, and partially in FIG. 3).

The general housing construction shown in FIG. 1, includes a rear panel 30, two side panels 32A and 32B, and front panel 34. A top panel 36 is L-shaped and supported by the front panel 34, side panel 32A and rear panel 30. The shape of top panel 36 provides a rectangular opening 38 within which the sheet supporting members 12 and 16 are adapted to move. A rectangular panel 39 is supported in opening 38, coplanar with top panel 36 and adjacent the top edges of rear panel 30 and side panel 32B. Control panel 40, provided on top panel 36, includes all of the necessary control switches for operating the system 10. A catch 42 is provided on top panel 36. The light source means 20 is attached to the top edge of the rear panel 30 by a hinge and bracket assembly 44, opposite catch 42.

Figure 7:
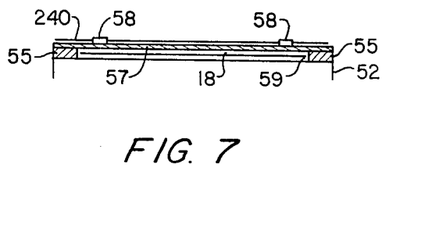
FIG. 7 is a cross-sectional, fragmentary view taken along line 7—7 in FIG. 3.

Referring to FIGS. 2 and 3 the first sheet supporting member 12 includes a base plate 50 and the end bars 52 and 54, extending above and respectively attached to opposite edges of base plate 50. Each end bar is provided with a pair of spaced-apart apertures for supporting cylindrical bearings 56A and 56B, with the center axes of the bearings 56A being aligned with one another, and the center axes of bearings 56B being aligned with one another and parallel with the center axes of bearings 56A. Bearings 56A and 56B enable supporting member 12 to freely slide on guide bars 66, the latter forming part of the second sheet supporting member 16, described in greater detail hereinafter. The top of end bar 52 is preferably flat and coplanar with (or disposed above) the top of end bar 54. As best shown in FIG. 7 the opposite ends of the top surface of end bar 52 respectively support a pair of spacers 55, secured to the top surface. Spacers 55 in turn support metal strip 57 so as to form a slot 59 between the bottom surface of the metal strip 57 and the top surface of end bar 52 and between the spacers 55. Slot 59 is dimensioned so that sheet 18 will freely slide through the slot. The top surface of strip 57 includes at least a pair of registration pins 58. The latter are adapted to secure the image bearing sheet 14 to strip 57 and thus bar 52. The end bar 54 is provided with an aperture 60 through its front and rear walls.

The second sheet supporting member 16 includes the two guide bars 66A and 66B, adapted to freely slide in the bearings 56A and 56B of member 12, and secured at their ends to end bars 68 and 70, respectively. End bars 68 and 70 are suitably spaced from end bars 52 and 54 so that there is sufficient space for members 12 and 16 to move relative to one another during the entire exposure of sheets 14 and 18. The top surface of end bar 68 of member 16 is preferably coplanar with (or disposed above) the top surface of end bar 70, and is preferably coplanar with the top surface of end bar 52 of member 12. The flat top of end bar 68 of member 16 also includes at least two shallow registration pins 72. The latter are adapted to secure the photosen-sitive sheet 18 to bar 68. Alternatively, the pins 72 secure one end of the tension sheet 246 (described hereinafter) to bar 68, sheet 246 in turn supporting photosensitive sheet 18.

Figure 4:
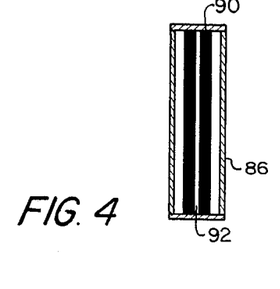
FIG. 4 is a cross-sectional view taken along line 4—4 of FIG. 3.

The light source means 20 for defining a light slit is best shown in FIGS. 1 and 3. Means 20 comprises the housing 80 hinged by assembly 44 to rear panel 30. Housing 80 comprises an upper cover 82 and a bottom plate 84. Plate 84 is formed with an elongated trough 86, the bottom of which is provided a slot 88. The latter extends perpendicular to the direction of travel of sheet supporting members 12 and 16 when the means 20 is in position for operation as shown in FIG. 3. As best shown in FIG. 4, a light-transmitting slit 90, photographically formed on a strip of film 92, is preferably secured over the bottom surface of trough 86 so that a more precise, constant-width, narrow light-transmitting slit is provided than otherwise provided by a mechanical slit. For example, a photographically-formed slit of two mils width can easily be provided compared to 10 mil wide mechanically-formed slits typically employed in some prior art devices. Slit 90 is preferably oriented so as to be parallel to slot 88, and thus perpendicular to the direction of travel of sheet supporting members. Housing 80 is constructed in a manner well known in the art to provide adequate ventilation (for example, through tube 93 shown in FIG. 1) for heat generated within the housing, and light only through the slit 90.

Light source means 20 further includes a source of light, such as a continuous filament lamp 94, supported across housing 80, preferably parallel to slit 90. Lamp 94 is disposed within a light baffle 96 so as to minimize any stray light from lamp 94, and reflected off the internal surfaces of housing 80, from striking slit 90. Baffle 96 includes an elongated slot 98 disposed parallel to lamp 94. A heat absorbing glass plate 100 is disposed over slot 98 and suitably connected to baffle 96 so as to absorb heat generated by lamp 94. A front surfaced reflector 102 is disposed relative to slot 98 so as to reflect light directed through slot 98 to a pair of half cylindrical lenses 104 and 106. The cylindrical axes of lenses 104 and 106 are disposed parallel to the elongated axis of lamp 94. The light is directed off a second front surface reflector 108 through a second glass plate 110, where it is focused by lenses 104 and 106 onto the film slit 90. Optically focussing light from lamp 94 helps provide a more uniformly intense beam of light through slit 90 than that provided by typical prior art light sources which use no optics The lamp 94, baffle 96, plate 100, reflectors 102 and 108, cylindrical lenses 104 and 106 and glass plate 110 are all suitably supported in a manner well known in the art within housing 80 so that they will not move when housing 80 is moved about its hinged support of assembly 44. Finally a latch 112 (shown in FIG. 1) is provided on the exterior portion of bottom plate 84 so as to engage latch 42 and secure means 20 in place. Latch 112 and catch 42 can also function as an electrical switch so that operation of the lamp 94 will not occur until means 20 is moved from the loading position, shown in FIG. 1 to the operating position illustrated in FIG. 2 wherein latch 112 is secured in latch 42.

The means, generally indicated at 22 in FIGS. 2 and 3, for moving sheet supporting members 12 and 16 at a substantially constant speed includes a pair of end support plates 120A and 120B, each secured in a stationary manner within the general housing construction shown in FIG. 1, respectively near the side walls 32A and 32B. The plates 120A and 120B support guide bars 122A and 122B so that the latter are parallel to one another, as well as to guide bars 66A and 66B forming part of sheet supporting member 16 and define the direction of movement of members 12 and 16 during the exposure operation. A lead screw 124, supported within cover 125 (partially cut away in FIG. 2) extends parallel to guide bars 122A and 122B, is rotatably supported in plates 120A and 120B and is preferably rotatably driven by a reversible, variable speed stepping motor 126 mounted on plate 120A. Preferably, an elastomeric coupling 127 of a type well known in the art couples the lead screw 124 with motor 126 to damp out mechanical jitter from the motor 126 so as to provide a smooth drive therebetween. Sheet supporting member 12 is slidingly supported on guide bars 122A and 122B at least at three points for horizontal stability. In the preferred embodiment shown, the base plate 50 of member 12 is secured to two spaced-apart linear support bearing blocks 130 (shown in FIG. 3), which in turn are supported by and slide on guide bar 122B; and to a third bearing block (not shown), identical to blocks 130 and supported by and slidable on guide bar 122A. The base plate 50 of member 12 is also coupled to lead screw 124 through a floating universal coupling, generally indicated at 132 (shown best in FIGS. 5 and 6) for providing ultra-smooth linearity of drive from the lead screw 124 to the member 12.

Figure 5:
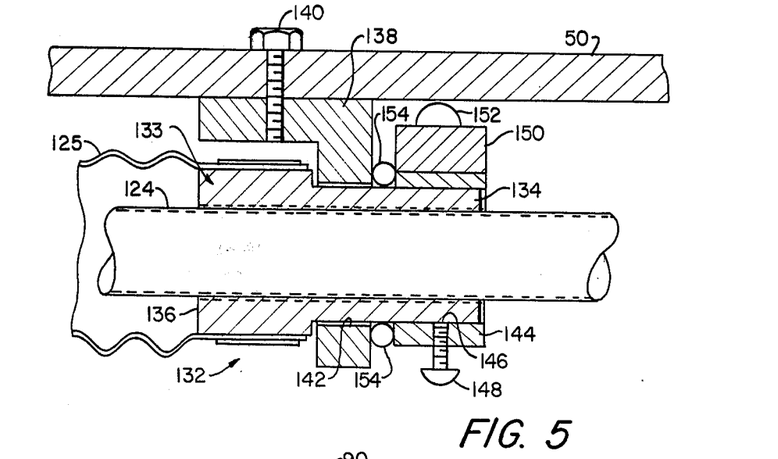
FIG. 5 is a partial cross-sectional view taken along line 5—5 of FIG. 2.
Figure 6:
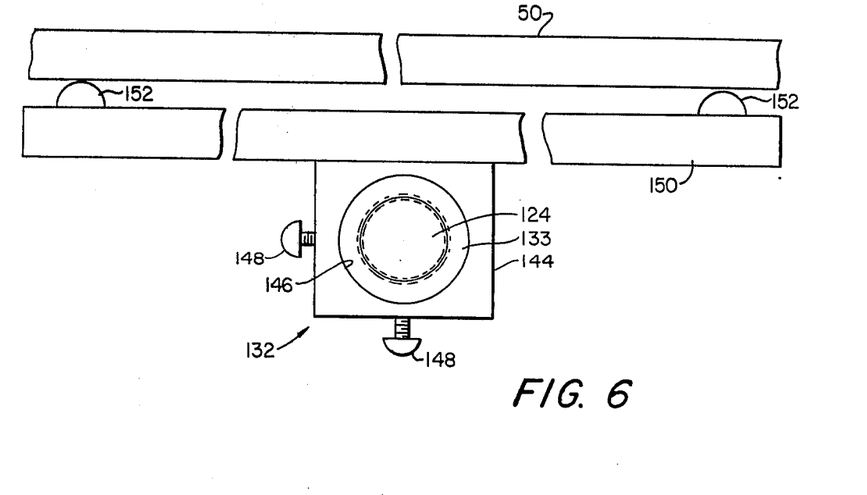
FIG. 6 is a cross-sectional view taken along line 6—6 in FIG. 5.

Coupling 132 includes a coupling nut 133 having a main shank section 134 and an enlarged diameter head portion 136 attached to screw cover 125. Nut 133 is fitted onto lead screw 124, as best shown in FIG. 5. An L-shaped bracket 138 has one portion secured by screw 140 to the base plate 50 of member 12, and its other portion including an aperture 142 for receiving lead screw 124 and section 134 of the nut 133. Aperture 142 has an internal diameter (1) larger than lead screw 124 and main section 134 of the nut so that a small amount of radial movement is permitted, and (2) smaller than the head portion 136 of the nut so that the head portion cannot pass through the aperture. Block 144 is provided with aperture 146 for snugly receiving the end of main section 134 opposite head portion 136 in a snug-fitting relation. A pair of set screws 148 (shown in FIGS. 3 and 5) extend through the block to aperture 146 securing block 144 to section 134 of the coupling nut. A rocker arm 150 is secured to the top of block 144 and extends across the bottom surface of base plate 50 of member 12 in a direction preferably perpendicular to the lead screw 124 and thus the direction of movement. Each end of arm 150 is provided with a low friction contact 152, preferably in the form of a nylon screw. When arm 150 is positioned parallel to base plate 50, each contact is slightly clear of the bottom surface of base plates. When the lead screw 124 is rotated in one direction the arm 150 will slightly pivot until one of the contacts 152 contacts the bottom of the base plate. The contacting contact 152 is adapted to easily slide relative to the base plate 50 as the member 12 is moved by the rotation of screw 124, as will be evident hereinafter. Finally, resilient means in the form of a toroidal roller or elastomeric bearing 154, such as a neoprene ring, is provided between bracket 138 and block 144.

In order to provide relative movement between members 12 and 16, means 24, best shown in FIGS. 2 and 3, includes the cam arm support assembly 160 comprising first support plate 162A, secured (in any known manner) and adapted to move with sheet supporting member 12. Preferably, plate 162A has its upper edge secured to the base plate 50 of member 12. Assembly 160 also includes a pair of plates 162B and 162C. The latter are maintained spaced-apart and parallel to one another by spacer rods 164 and to plate 162A by spacer rod. Plates 162B and 162C are secured to sheet supporting member 12 in any known manner, such as securing the top edge of plate 162B to the edge of base plate 50, opposite to the edge secured to plate 162A, so that plates 162B and 162C are also movable with member 12. Plates 162B and 162C, each includes a vertically-oriented edge 168, disposed parallel to the other in a plane normal to the rotation axis of screw 124, and thus the direction of movement of members 12 and 16.

The cam arm assembly 180 is freely rotatably supported between plates 162B and 162C about a cam arm pivot axis defined by the spacer rod 166. The pivot axis is parallel to the plane defined by edges 168. Assembly 180 includes cam arm 182 and block 184, both secured so as to pivot together about rod 166 between the plates 162B and 162C.

Cam arm 182 is provided with a flat edge 186 which cooperates with pin 188 provided on the side of front plate 68 of sheet supporting member 16. Means are provided for biasing pin 188 against edge 186. The biasing means preferably includes a constant force, spring motor assembly 190 secured to base plate 50 of member 12. The assembly includes a constant torque motor 191 and a wire or cable 192 secured at one end to the motor 191 and at its other end to the rear plate 70 of member 16, extending through aperture 60 of rear plate 54 of frame member 12. As will be evident to one skilled in the art the cable will be in constant tension by motor 191 so as to provide a constant biasing force by pin 188 against the edge 186 of the cam arm 182 of the assembly 180.

The block 184 of assembly 180 includes a yoke portion having slotted arms 200 for accommodating roller bearing assembly 202. Assembly 202 includes axle 204 and a pair of roller bearings 206, adapted to freely rotate about axle 204 along the respective vertically-oriented edges 168 of plates 162B and 162C. Spring bias means, such as spring 208, biases bearings 206 against edges 168. Assembly 202 also comprises a third roller bearing 208, adapted to freely rotate about axle 204 along the variable ramp surface 214 of ramp 216 of the differential speed setting assembly 212.

Differential speed setting assembly 212 disposed within the general housing construction of FIG. 1 includes the adjustable ramp 216 pivotably supported by the bracket 218 about the pivot axis 219 disposed parallel to the pivot cam axis defined by spacer rod 166. The end of ramp 216, opposite pivot axis 219, includes an elongated slot 220 for receiving pin 222 attached to follower 224. The latter is secured to and adapted to move with the rotation of lead screw 226 mounted to rotate about a substantially vertical axis transversely to the direction of slot 220. Lead screw 226 is rotatably supported at each end and driven by any suitable means, such as by a reversible variable speed stepping motor 230, coupled to the screw 226 by belt 228. Motor 230 is mounted in any conventional manner, and is suitably coupled through gearing 236 to lead screw 226 so as to indicate the position of follower 224. Counter 234 will therefore provide a reading of the scalar change in the dimension of the image to be recorded from the image bearing sheet as a function of the percentage change from the original dimension, which in turn is a function of the angle made by the ramp surface 216 of ramp 214 relative to the horizontal defined by a plane parallel to each of the rotation axis of lead screw 124 and guide bars 66 and 122.

Finally, in order to insure contact between the two sheets 14 and 18 as the two sheets move through the light provided through film slit 90, a brush 238 (shown in FIGS. 1 and 3) extending the length of slit 90 is mounted below the slit between front and rear plates 52 and 70, with the bristles oriented at an angle, e.g., 55 to the horizontal, and biased against the slit. Brush 238 is positioned closely to rectangular panel 39. Bar 52 of member 12 is positioned adjacent brush 238 just prior to the exposure operation. Further, for certain films having a heavy matte surface which inhibits the smooth sliding action of the emulsions at the point of brush pressure, a sheet tension attachment assembly can be attached. Specifically, when the two sheets are moved relative to one another the slower moving sheet is supported on a support sheet which is under tension. As shown in FIG. 1, an angle 242 is mounted to top panel 39 adjacent and parallel to brush 238 for supporting one end of inflexible plate 244. Plate 244 extends over panel 39 and is secured to the top surface of side panel 32B in any suitable manner, such as with double sided adhesive tape secured between the underside of plate 244 and side panel 32B. A flexible tension sheet 246, made for example of a vinyl material, or other suitable material, is secured by pins 72 at one end to the bar 68, extends through slot 59 and is placed under tension by securing its other end to a springed bias cable 248, the latter being secured to spring motor 250 at the opposite end of plate 244.

In operation the original image bearing sheet 14 is mounted on control strip 240 (shown in FIG. 1) with pre-punched holes, for example 6.000 inches apart. Alignment of sheet 14 with the pre-punched holes of strip 240 is accomplished in any known manner, such as at a light table (not shown) using a grid or set square. The light source means 20 is then raised to its upright position as shown in FIG. 1. The photosensitive sheet 18 is first mounted to member 16 over brush 238 by using registration pins 72, which extend through pre-punched holes in sheet 18. Sheet 14, mounted on control strip 240, is then secured to the metal strip 57 of the member 12 by the registration pins 58 which extend through the pre-punched holes. The setting of the amount of change in the scalar of the dimension of the image on sheet 14 in the direction of movement of members 12 and 16 is next adjusted by energizing the reversible variable speed stepping motor 230. Where the ramp surface 214 of ramp 216 is level with the horizontal, counter 234 will read "100", and there is no change in the scalar of dimension of the reproduced image defined by the direction of movement during exposure. Raising follower 234 so as to increase the angle of the ramp surface 214 relative to the horizontal will cause counter 234 to decrement and provide an angle of inclination for roller bearing 208. This will result in a decrease or shrinking of the image in the scalar of the dimension of movement of members 12 and 16, during exposure, by an amount equal to the reading of counter 234. Thus, if counter reads "90" the scalar will be 90% of the original. Finally, decreasing the angle of the ramp surface relative to the horizontal will cause counter 234 to increment and provide an angle of declination for roller bearing 208. This results in an increase or enlargement of the image in the dimension parallel to the movement of members 12 and 16. The setting of the counter 234 as an indication of the reproduced dimension as a percentage of the original image (e.g., 80% through 120%) will be a linear function of the position of follower 224, so as to provide an accurate reading.

Once the sheets 14 and 18 are mounted on members 12 and 16 and the ramp 216 positioned to provide the desired setting of dimension reproportioning, the light source means 20 is lowered so that the latch 112 engages and locks in catch 42 and the sheets are forced into contact with one another between brush 238 and film slit 90 at the leading edge of sheet 14. The motor 126 and lamp 94 are both energized simultaneously. Energized motor 126 causes screw lead 124 to rotate in nut 133. This results in member 16 moving along guide bars 122A and 122B toward plate 120A. By virtue of the motor assembly 190 and wire 192 the member 12 moves with member 16. As both members 12 and 16 move toward plate 120A, the roller bearing 208 rolls along the ramp surface 214 of ramp 216. If the ramp has been set for no dimension change, the roller bearing 208 will not move up or down as members 12 and 16 move. Consequently, the position of roller bearings 206 will not move relative to the vertically-oriented edges 168 of plates 162B and 162C. As a result block 184 and cam arm 182 will not pivot about spacer rod 166 as members 12 and 16 move along guides 122A and 122B and there is no relative movement between the members.

If the ramp surface 214 of ramp 216 has been set at an angle of inclination (so as to provide image shrinkage), the roller bearing 208 will rise as the members 12 and 16 move toward plate 120A. As roller bearing 208 rises, roller bearings 206 will move up the edges 168 causing block 184 and cam arm 182 to pivot about spacer rod 166 (in a clockwise direction as shown in FIG. 3). The edge 186 of cam arm 182 will thus push on pin 188 against the force provided by motor assembly 190 and wire 192. This slows the speed of member 12 relative to member 16, since the guide rods 66A and 66B freely slide in bearing 56A and 56B. It should be appreciated that the greater the angle of inclination of ramp 216 the faster cam arm 184 pivots the slower member 16 moves relative to member 12 so as to provide a greater shrinkage of the image dimension.

If the ramp surface 214 of ramp 216 has been set at an angle of declination, the roller bearing 208 will drop as the members 12 and 16 move toward plate 120A. As roller bearing 208 drops, roller bearings 206 will move down the edges 168 causing block 184 and cam arm 182 to pivot about spacer rod 166 (in a counterclockwise direction as shown in FIG. 3). The edge 186 of cam arm 182 will thus pull away from pin 188 as members 12 and 16 move toward plate 120A lessening its force on the pin. The force provided by motor assembly 190 and wire 192 will pull member 16, so that member 16 will move faster than member 12. The greater the angle of declination the faster cam arm 182 pivots and the faster member 16 moves relative to member 12 so as to provide a greater enlargement of the image dimension.

When the entire sheets 12 and 16 pass through the light provided by film slit 90, the motor 126 and lamp 94 are deenergized. The latch 112 is disengaged from catch 42, and housing 80 is pivoted up about the hinge assembly 44. The sheets 12 and 16 are removed, and motor 126 is energized in the reverse direction causing lead screw 124 to rotate in an opposite direction. This results in members 12 and 14 moving in the direction of plate 122B to the starting position wherein brush 238 is adjacent the end bar 52 of member 12.

When films having a heavy matte surface which inhibit the smooth sliding action of the emulsions are processed, the sheet tension attachment is utilized to provide in tension a supporting surface for the slower moving sheet 14 or 18 so as to reduce the surface friction between the two sheets. Specifically, the arrangement shown in FIG. 1 is utilized when image reduction is desired, i.e., when sheet 18 is moved more slowly than sheet 14. In particular, the remote or lagging end of sheet 18 is secured to tension sheet 246 with tape 252 or the like so that as the sheet 18 is pulled (to the left as shown in FIG. 1) the sheet 246 is also pulled against and held in tension by the bias of spring cable 248 allowing sheet 14 to move freely over the surface of sheet 18. When enlarging the image dimension, it is necessary to hold a support for the image bearing sheet 14 under tension. Accordingly, the image bearing sheet 14 is secured to a clear acetate sheet (not shown). The latter is secured to the top of bar 52 with registration pins 58. The leading edge of sheet 14 is secured to the acetate sheet and positioned between the acetate sheet and the photosensitive sheet 18. The cable 248 is disconnected from tension sheet 246 and secured to the lagging edge of the acetate sheet. The leading edge of sheet 18 is secured to sheet 246 so that during operation sheets 14 and 18 will slide more smoothly relative to one another.

The above-described apparatus made in accordance with the present invention provides several advantages over the apparatus shown in U.S. Pat. Nos. 3,445,165 and 4,008,959. Use of brush 238 against film slit 90 is believed to provide a more intimate contact between the image bearing and photosensitive sheets 14 and 18 than otherwise provided by the roller contact of the prior art. The use of the optics provided in light source means 20, as well as film slit 90 provides a narrower, more uniformly intense slit of light for exposing the sheets during exposure than otherwise provided by the light sources and mechanical slits of the prior art patented systems. Further, the optics allows for the use of a high intensity lamp so that much lower speed film can be used for sheets 18. Sheets 18 can retain a "positive" (as opposed to a "negative") image, as should be in flexographic printing for subsequent contact with a photopolymer plate. This is accomplished even though the film slit 90 is typically one-fifth as wide as the mechanical slits of the prior art. The use of lead screw 124, motor assembly 190 and wire 192 provides a more uniform drive system than provided by the prior art systems which employ pulley and cable systems. The elastomeric coupling 127 damps mechanical jitter which otherwise would be transmitted by motor 124 to lead screw 126. The floating universal coupling 132 prevents jitter of the member 16 resulting from any rolling motion of the nut 133 due to wobble of the lead screw 124. Specifically, as lead screw 124 rotates in nut 133 during exposure, block 144 compresses the resilient elastomeric ring 154 against bracket 138 causing members 12 and 16 to move with rotation of the screw 124. Ring 154 will dampen the vibrations caused by rolling motion of nut 133 due to wobble of the lead screw 124. Finally, since the roller bearings 206 move along vertically-oriented edges 168, the relative speed of members 12 and 16, which would be a sinusoidal function of the angle of the cam arm without such compensation, is converted to a linear differential speed. This enables the setting of reproportioning of the scalar of the image dimension to be a linear function of the position of follower 224. Further, by holding a supporting surface for the slower moving sheet 14 and 18, under tension, a smooth sliding between the sheets is more likely to occur.

Since certain changes may be made in the above-described apparatus, without departing from the scope of the invention, it is intended that all matter contained in the above description or shown in the accompanying drawings shall be interpreted as illustrative and not in a limiting sense.

What is claimed is:

1. An image reproportioning system for reproducing an image from an image bearing sheet onto a photosensitive sheet so that the scale of one dimension of the reproduced image can be changed relative to its other dimension, said system comprising:

a first sheet supporting member for supporting one of said sheets;

a second sheet supporting member for supporting the other of said sheets in substantial juxtaposition with said one sheet;

means for defining a slit of light;

means for moving said first and second sheet supporting members at a substantially constant speed in a first direction parallel to the direction of said one dimension and transverse to said slit of light so that said sheets pass through and are exposed by said slit of light;

means for moving said first and second sheet supporting members relative to one another at a substantially constant relative speed as said sheets are exposed to said slit of light, said relative speed being a function of the percentage of change of said scale of said one dimension, said means for moving said first and second sheet supporting members relative to one another including (a) means for spring biasing said first and second members so that said second member is biased to move relative to said first member in a direction parallel to said first direction;

(b) ramp means;

(c) means for adjusting the angle of inclination or declination of said ramp means in said first direction; and (d) cam arm means (1) pivotally mounted to and adapted to move with said first sheet member, and (2) cooperative with said ramp means so as to move said second member relative to said first member at a constant linear speed against said bias means as said first and second members move at said substantially constant speed.

2. A system according to claim 1, wherein said second sheet supporting member is supported by said first sheet support member.

3. A system according to claim 2, wherein said second sheet member includes a pair of guide bars slidingly mounted on said first sheet supporting member so as to be movable relative to said first sheet supporting member.

4. A system according to claim 3, wherein said means for spring biasing said first and second members includes a constant torque motor attached to one of said members and wire means for coupling said motor to the other of said members.

5. A system according to claim 1, wherein said means for defining said slit of light includes a source of light, slit means for defining said slit, and means for focussing light from said source onto said slit.

6. A system according to claim 5, wherein said slit means includes a strip of film having an image of said slit.

7. A system according to claim 5, further including means for biasing said sheets against said slit during exposure to said light.

8. A system according to claim 7, wherein said means for biasing said sheets against said slit includes brush means having bristles biasing said sheets against said slit.

9. A system according to claim 1, wherein said means for moving said supporting members at a substantially constant speed includes guide bar means for supporting said first member for movement in said first direction, a lead screw mounted for rotation about an axis parallel to said first direction, means for rotating said lead screw at a constant rotational speed about said axis, and means for coupling said lead screw to said first sheet supporting member so that rotation of said lead screw causes said first member to move along said guide bar means in said first direction.

10. A system according to claim 9, wherein said means for coupling said lead screw to said first member includes nut means rotatably mounted on said lead screw, mounting means secured to said first sheet supporting member and slidingly receiving said nut means, block means secured on said nut means, resilient means secured between and in contact with said block means and said mounting means, and rocker arm means mounted on said block means between said block means and said first sheet supporting member, wherein rotation of said lead screw so as to move said first and second members in said first direction causes said block means to compress said resilient means against said bracket causing said first member to move in said first direction.

11. A system according to claim 10, wherein said rocker arm extends transversely to said first direction.

12. A system according to claim 11, wherein said rocker arm further includes a low friction contact at each end so that at least one of said contacts contacts said first member and therefore limits the rotation of said nut means as said lead screw is rotated.

13. A system according to claim 1, wherein said cam arm means includes a cam arm mounted for rotation about a pivot axis normal to said first direction, roller means mounted for rotation about an axis parallel to said pivot axis, and coupled to said cam arm so as to rotate with said cam arm about said pivot axis, said roller means being cooperative with said ramp means so that as said first and second members move at said constant linear speed said roller means moves along said ramp.

14. A system according to claim 13, wherein said cam arm means includes means secured to said first sheet member and defining a pair of vertical edges, and said roller means includes a pair of rollers cooperative with said vertical edges so that said rollers follow said vertical edges as said roller means cooperates with said ramp.

15. A system according to claim 14, wherein said second sheet supporting member includes a pin cooperative with said cam arm so that said cam arm exerts a constant force against said pin in a direction opposite said first direction.

16. A system according to claim 15, wherein said ramp means is pivotably mounted at one end about a pivot axis parallel to said first pivot axis, and said means for adjusting the angle of inclination or declination includes a lead screw mounted for rotation about a second rotation axis, follower means rotatably mounted on said lead screw and coupled to the ramp means at a location spaced from said pivot axis so that rotation of said lead screw moves said follower, which in turn pivots said ramp means so as to vary said angle of inclination or declination, and the position of said follower is a linear function of the percentage of enlargement or reduction of said scalar of said one dimension.

17. A system according to claim 1, further including means for reducing the surface friction between said image bearing and photosensitive sheets when said sheets are moved relative to one another.

* * * * *